Jan. 28, 1941. L. STEINHORN 2,229,776
VEHICLE PARKING DEVICE
Filed Aug. 22, 1938 3 Sheets-Sheet 1

Inventor,
Louis Steinhorn,
By James T. Duhamel,
Attorney

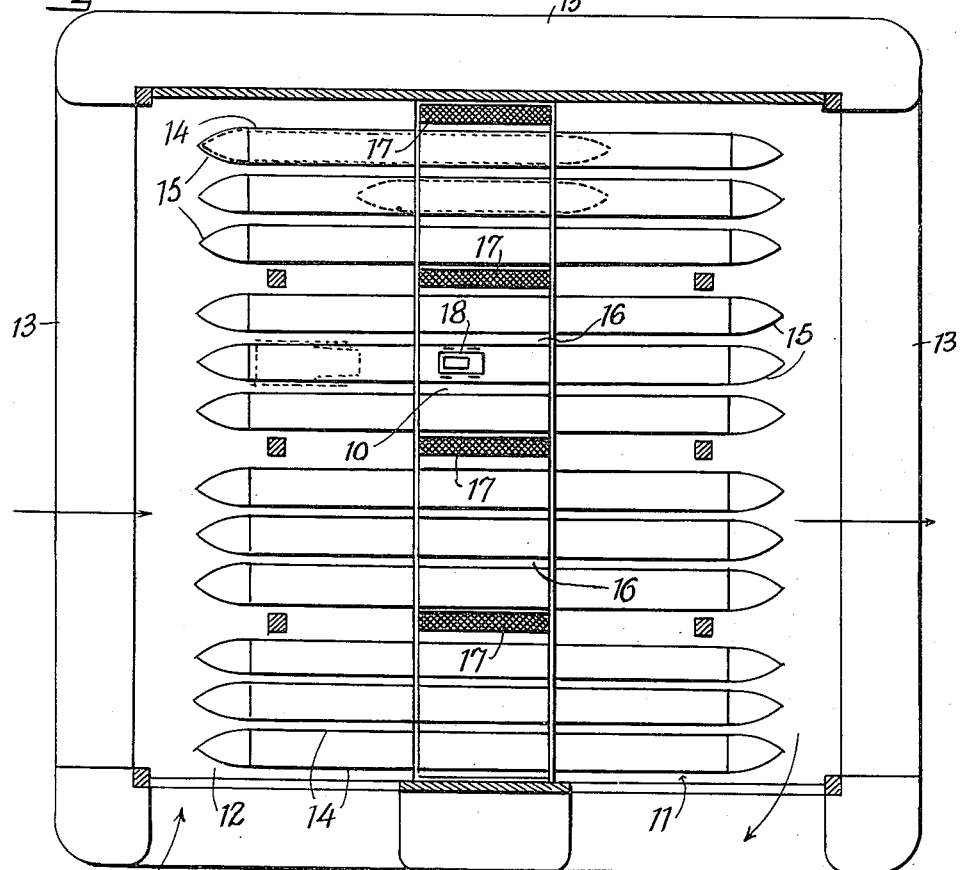
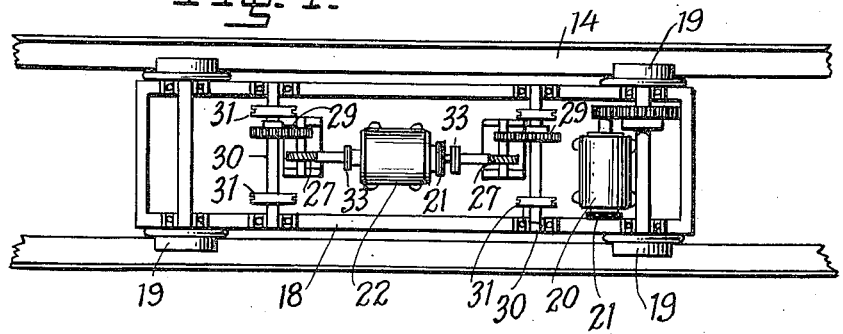

Jan. 28, 1941.  L. STEINHORN  2,229,776
VEHICLE PARKING DEVICE
Filed Aug. 22, 1938   3 Sheets-Sheet 3
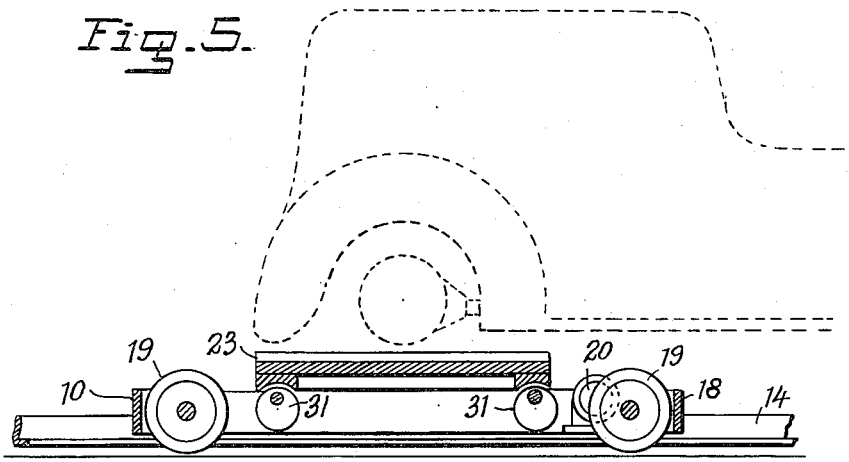
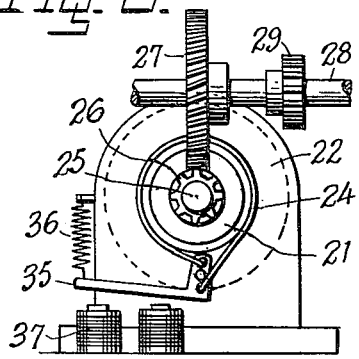 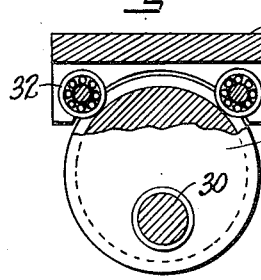 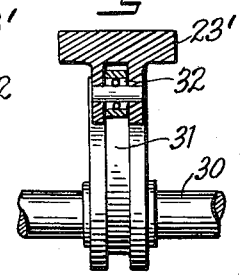
Inventor,
Louis Steinhorn,
James P. Duhamel.
Attorney Patented Jan. 28, 1941

2,229,776

UNITED STATES PATENT OFFICE 2,229,776

VEHICLE PARKING DEVICE

Louis Steinhorn, New York, N. Y.

Application August 22, 1938, Serial No. 226,176

3 Claims. (Cl. 214—16.1)

This invention relates to means for parking vehicles and its object is to provide a device which can be occupied to its full capacity and not requiring floor space to move one or more vehicles in order to remove the desired one.

A further object of the invention is to move the vehicles or cars in and out of the device or structure at the highest possible speed with the least possible interruption of the service.

The device comprises a structure having a plurality of floors and is divided into a right and left wing with an elevator shaft between them, the said shaft housing one or more elevators, each elevator car or carrier having several decks, one above the other, and each deck has enough space thereon for one or more cars or vehicles.

These and other objects of the invention are further described in the following specification, set forth in the appended claims and illustrated in the accompanying drawings, wherein:

Fig. 3 is a plan view of the ground floor of the device.

Fig. 4 is a plan view partly in section of a parker on a track.

Fig. 5 is a longitudinal vertical sectional view of the same.

Fig. 6 shows a brake and lifting jack mechanisms for engaging a vehicle.

Figs. 7 and 8 are detail views of the lifter jacks.

Figure 1:
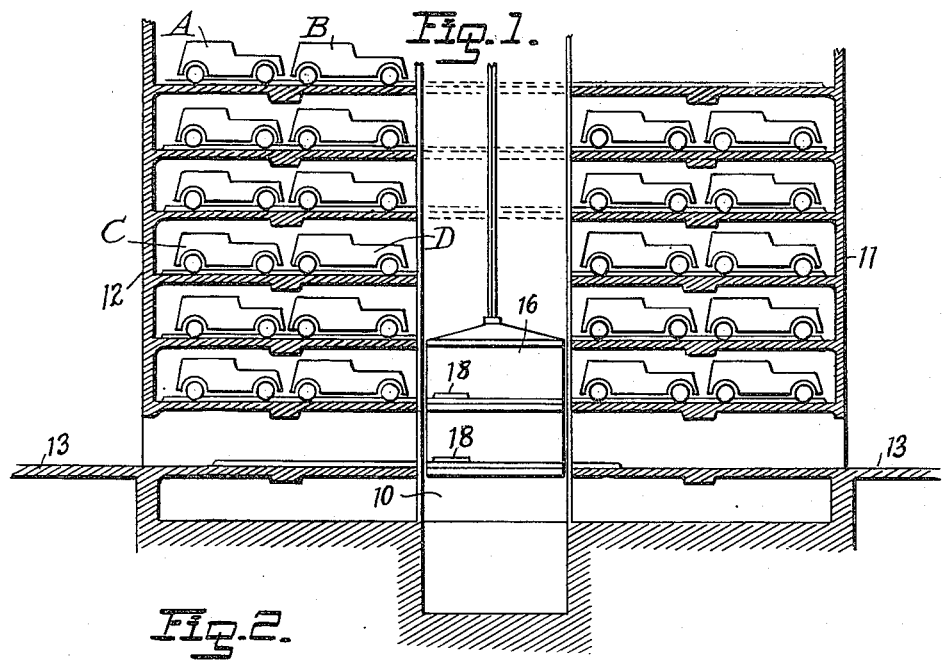
Fig. 1 is a longitudinal vertical sectional view of the device.

The device comprises a structure having a plurality of floors divided by an elevator shaft 10 into two wings 11 and 12 surrounded by streets or sidewalks 13, the floors being provided with tracks 14 having guiding ends 15.

Figure 2:
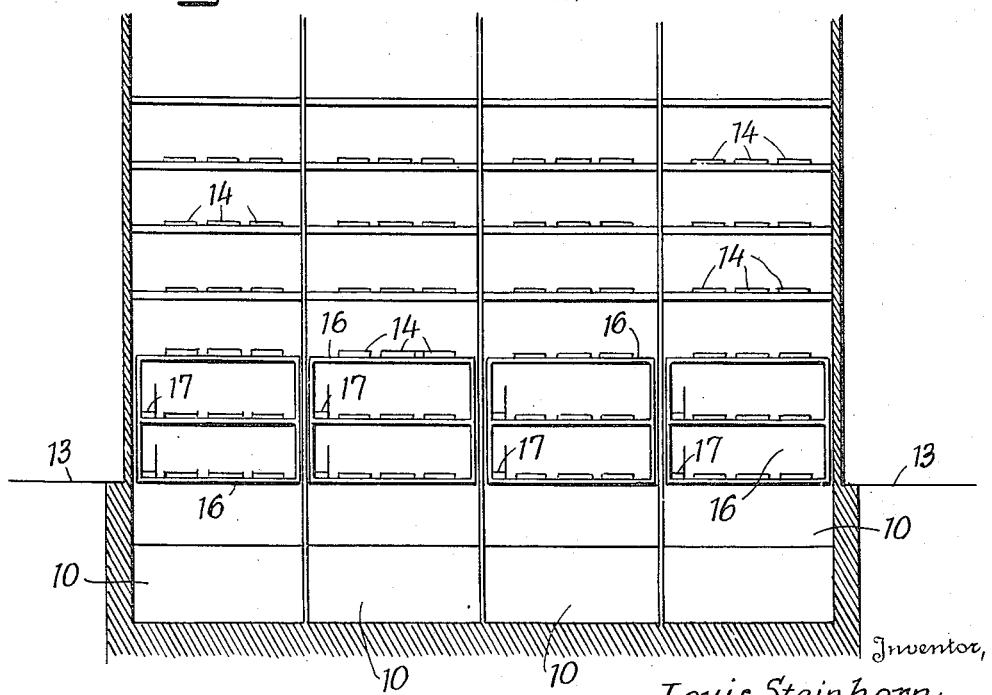
Fig. 2 is a transverse vertical sectional view of the same.

The elevator shaft has its cage or carrier 16 of the conventional type to move straight up or down. Figs. 2 and 3 show four elevator shafts and cages but it is obvious that any desired number may be employed.

Each elevator cage has two decks with an operator's stand 17 and each deck has suitable spacing tracks 14 to guide the cars to their proper position on the elevator deck and registering with the tracks in the wings of the structure.

The ground floor shown in Fig. 3 serves as the receiving floor for all vehicles coming in on the left side of this floor and for exit on the right side of this floor. The plan in Fig. 3 may be located on a corner lot and where the vehicles may enter the building from two sides and leave from two sides, one being an alley.

If the structure stands in the middle of a block, the cars would have to enter on the south side and leave from the south side, consequently all of the tracks would have to be of lesser length than shown in the drawings in dotted lines.

The means for locating or removing the vehicles is known as a "parker" and as shown in Figs. 4 and 5 consists of a frame 18 controlled by the elevator operator from remote source of any conventional design and located on the operator's stand 17 as shown in Figs. 1, 3 and 17 and designated 70 in U. S. patent to A. M. Kent, No. 2,113,986, April 22, 1938. The parker is run under a car as shown in dotted lines in Fig. 5, jacks up the car by any solid part of it and pulls it onto the elevator and delivers the car to its desired floor and space.

Assuming that the car A on the seventh or top floor is to be taken down to the street, the parker from the elevator pulls the car B across the elevator deck over to the right wing of the structure. Then the parker is moved under car A and carries it to the elevator to be delivered to the street.

But if all the spaces throughout the structure should be filled to capacity, as for instance on the fourth floor car C is to be taken down to the street, car D has to be removed in order to clear the way for car C. In this case the elevator now moves up and the second deck registers with the fourth floor and the parker pulls car D onto the second deck of the elevator which moves down and registers the first deck with the fourth floor and car C is pulled onto the first elevator deck, then the elevator moves up and car D is put back in its original place on the fourth floor and car C is carried to the street level.

As shown in Fig. 1, space is provided for two cars, one behind the other, for each track on each wing, requiring a double deck elevator, when the structure is large enough to permit three or more cars to be lined up one behind the other on each track, one elevator having three or more decks may be required.

The structure may be a building comprising bricks or concrete walls and a roof. It may also be built of steel or other structural members, prefabricated steel or other prefabricated members permanently assembled or portable. In this case the structure may be termed a parking device.

The drawings show in detail the construction of the parker although any other type may be used.

The hereinafter explained parker is designed to withstand all the stresses of heavy duty performance and the friction factor is one of the main points in question. Every rotating shaft and axle is mounted on heavy duty ball or roller bearings and every part exposed to wear is made in such manner that it can be removed and replaced by a spare part in a few minutes and the parker can be quickly set in operation again, eliminating the possibility of any part of the building being tied up for a long period of time due to mechanical or electrical disorder.

The flanged or railway type of wheel 19 is used because it operates with the least possible resistance, resulting in economy of operation.

In Figs. 4 and 5 an iron frame 18 is carried on flanged or railway wheels 19 rigidly mounted on axles journaled in ball or roller bearings and rotated by an electric motor 20 through a set of reduction gears. Both axles carrying the frame 18 may be driven by electric motors, as the remaining motor may be put in action when the other motor fails. The motor 20 is provided with a brake 21 to prevent rolling-on of the parker when the electric current is cut for stopping.

The frame 18 also carries an additional motor 22, shown in Fig. 6 whose motive shaft 25 carries a worm 26 that operates a worm wheel 27 on a transverse shaft 28 with reduction gearing 29 that rotates a parallel shaft 30 carrying cams 31 that support a platform 23 on ball or roller bearings 32, as shown in Figs. 7 and 8, and as these duplicated shafts and cams, near opposite ends of the frame 18, are rotated by motor 22, the platform 23 is raised to engage and support a car, shown in dotted lines in Fig. 5, to move it backward or forward while being placed or displaced.

Motor 22 is provided with a brake 21, identical with that on motor 20 and comprises a brake band 24 put in action and under strain by a coil spring 36 connected to brake lever 35 pivoted to apply or release the brake band 24 and is the armature of appropriately energized electro-magnets 37.

Said motor 22 also carries flexible couplings 33 and duplicate worm gears 26—27 to simultaneously rotate the four cams 31 and the worm gear and pinion form one unit which can be readily removed and be replaced with a spare part set with little loss of time.

When the motor 22 turns the shafts 30 all four eccentrics 31 will turn in unison. The eccentrics will turn from their down position, as shown, to the up position and the platform 23 will be lifted. The platform will in turn raise the dotted car and the wheels 19 will move the parker to the desired location.

Fig. 6 shows a detail of the brakes 21 for both of the motors 20 and 22 and has the usual brake drum mounted rigidly on motor shaft 25 and the brake band 24 with suitable brake lining rides on the brake drum 21 and a strong helical spring 36 tightens the brake band 24 by means of the armature lever 35. When the current for the motor is turned on, the electro-magnet 37 pulls the lever 35 and loosens the brake band 24 so that the motor will run freely.

When the current for the motor is shut off, the magnet 37 will release the lever 35 and the spring 36 will pull the brake band tight and the motor will stop instantly.

Figs. 7 and 8 show the detail of the eccentrics 31. The grooved cam carried by shaft 30 and rotating in roller yokes 23' has two ball bearing rollers 32 running in the groove of the cam. The yokes 23' are rigidly secured to the platform 23 and ride loosely on the eccentrics so that the platform can be lifted with the yokes and rollers, from the eccentrics in case a quick repair job has to be done.

It is obvious that the parts may be altered or modified, or otherwise arranged without departing from the essential features above described or from the scope of the appended claims.

I claim:

1. In parking structures, the combination of multiple floors divided horizontally by an elevator shaft, tracks for the reception of a plurality of tandem vehicles on each side of the said shaft, a multi-decked elevator having operator stands and registering with super-situated floors to receive vehicles or permit them to pass to opposite floors, and dollies adapted to engage the vehicle and be moved over the tracks of the elevator and floors from the operators' stand.

2. In parking structures, the combination of multiple floors divided by an elevator shaft, multi-decked elevators in the shaft, tracks on said floors and elevators and the latter being adapted to be made flush with the tracks on the floors so that vehicles may be stored in tandem on the tracks on the floors or removed by the multiple decked elevator, and dollies adapted to be operated electrically from an operator's stand on the elevator, to engage and move the vehicles.

3. In parking structures, the combination of multiple floors divided by an elevator shaft, a double deck elevator moving in the said shaft and adapted to register flush with the different floors, tracks with guiding ends on the floors and decks of the elevator and adapted to permit the storing in tandem of vehicles or their transfer to the elevator for removal, operator's stands on the floors of the double decked elevator, and dollies operating on the rails and from said operator's stands to engage vehicles and to shift them along the floors and to the elevators for transportation.

LOUIS STEINHORN.